United States Patent [19]

Young

[11] Patent Number: 4,902,223

[45] Date of Patent: Feb. 20, 1990

[54] OXY-FUEL BURNER FOR BURNING PULVERIZED FUEL

[76] Inventor: Philip J. Young, Belton Cottage, Wrexham Road, Whitchurch, Salop, England

[21] Appl. No.: 209,456

[22] Filed: Jun. 20, 1988

[30] Foreign Application Priority Data

Jun. 26, 1987 [GB] United Kingdom ............... 8715030

[51] Int. Cl.⁴ .............................................. F23Q 9/00
[52] U.S. Cl. .................................... 431/284; 431/187; 431/16; 110/189; 110/263
[58] Field of Search ................. 431/16, 22, 187, 160, 431/284; 110/186, 189, 262, 263; 73/40.5 R

[56] References Cited

U.S. PATENT DOCUMENTS

| | | | |
|---|---|---|---|
| 3,910,209 | 10/1975 | Albrecht et al. | 110/189 |
| 4,523,529 | 6/1985 | Poll | 110/263 |
| 4,591,331 | 5/1986 | Moore | 431/16 |

FOREIGN PATENT DOCUMENTS 0102805 8/1980 Japan ............................. 431/16

Primary Examiner—Randall L. Green

[57] ABSTRACT

The wall (5) of a tube (2) for delivering pulverized fuel to the outlet (4) of an oxy-fuel burner (1) forms part of a chamber (6) which is pressurized or evacuated. The pressure in the chamber is continuously monitored. If the pressure in the chamber (6) changes in a way indicative that the wall (5) of the oxy-fuel burner (1) has failed the oxy-fuel burner (1) is automatically shut down.

4 Claims, 3 Drawing Sheets

OXY-FUEL BURNER FOR BURNING PULVERIZED FUEL

TECHNICAL FIELD

This invention relates to oxy-fuel burners for burning pulverized fuel.

BACKGROUND ART

Oxy-fuel burners for burning pulverized fuel generally comprise a central tube through which pulverized fuel, for example pulverized coal is blown by a stream of air. Oxygen is introduced in a passageway around (concentric to) the central tube and mixes with the pulverized fuel at the tip of the oxy-fuel burner One of the problems with this arrangement is that the pulverised fuel can be very abrasive. As a result the wall of the central tube, which is usually made from stainless steel, has to be checked frequently. If the wall of the central tube fails in an oxy-fuel burner then the pulverised fuel may mix with the oxygen inside the burner and explode with very serious consequences.

This problem can be mitigated to some extent in an oxygen/natural gas/pulverised fuel burner by surrounding the central tube with the natural gas supply passageway However, both the wall of the central tube and the natural gas supply passageway can erode to bring both the natural gas and pulverized fuel into direct contact with the oxygen.

DISCLOSURE OF INVENTION

The present invention aims to provide an oxy-fuel burner for burning pulverized fuel in which failure of the pulverised fuel supply tube can be easily detected.

According to the present invention there is provided an oxy-fuel burner for burning pulverized fuel, which burner comprises a tube for delivering pulverized fuel to the outlet of the burner, and one or more passageways around (concentric to) said tube for delivering oxygen or oxygen enriched air to said outlet, characterised in that the wall of said tube forms one side of a chamber which extends circumjacent said tube and separates said tube from said passageway(s), said chamber being provided with a connection so that the pressure therein can be monitored.

Preferably, said chamber is provided with means to automatically monitor the pressure in said chamber. Such monitoring may be carried out continuously or intermittently. In such an arrangement means are preferably provided which automatically shut down the oxy-fuel burner if a pressure change in said chamber is detected which indicates that the wall of the tube has failed.

In one embodiment of the invention a second wall bounding said chamber defines the or an inner wall of the or one of said passageways for supplying oxygen or oxygen enriched air to the outlet of said burner.

In another embodiment of the invention a second wall bounding said chamber is spaced from the or an inner wall of the or one of said passageways for supplying oxygen or oxygen enriched air to the outlet of the burner.

For a better understanding of the present invention reference will now be made, by way of example, to the accompanying drawings in which:

Figure 1A:
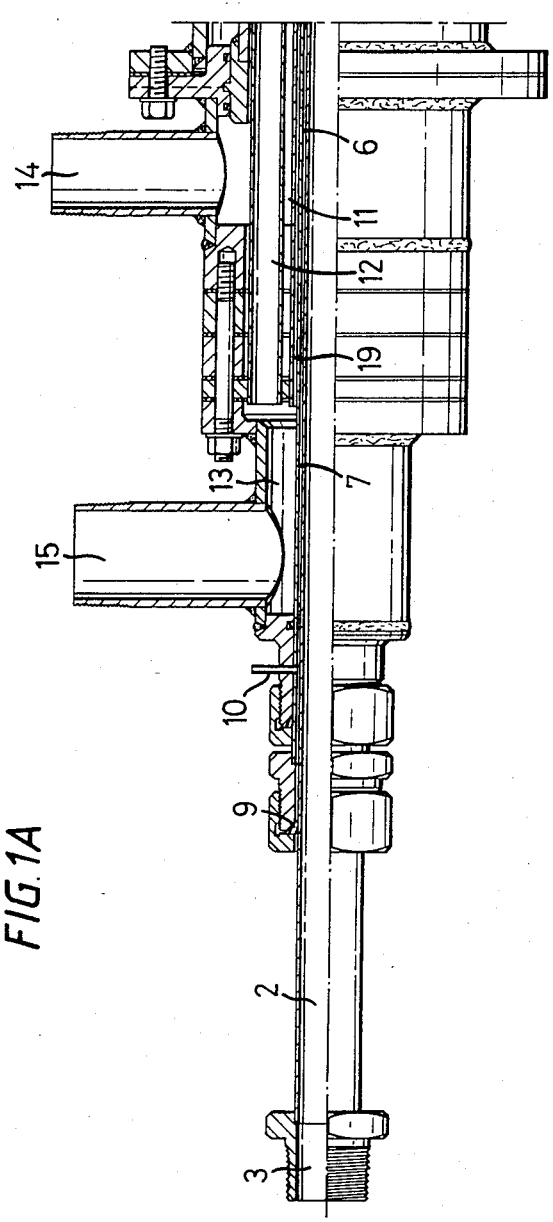
FIGS. 1A and 1B together show a plan view, partly in cross-section, of an experimental oxygen/natural gas/pulverized fuel burner in accordance with the present invention.
Figure 1B:
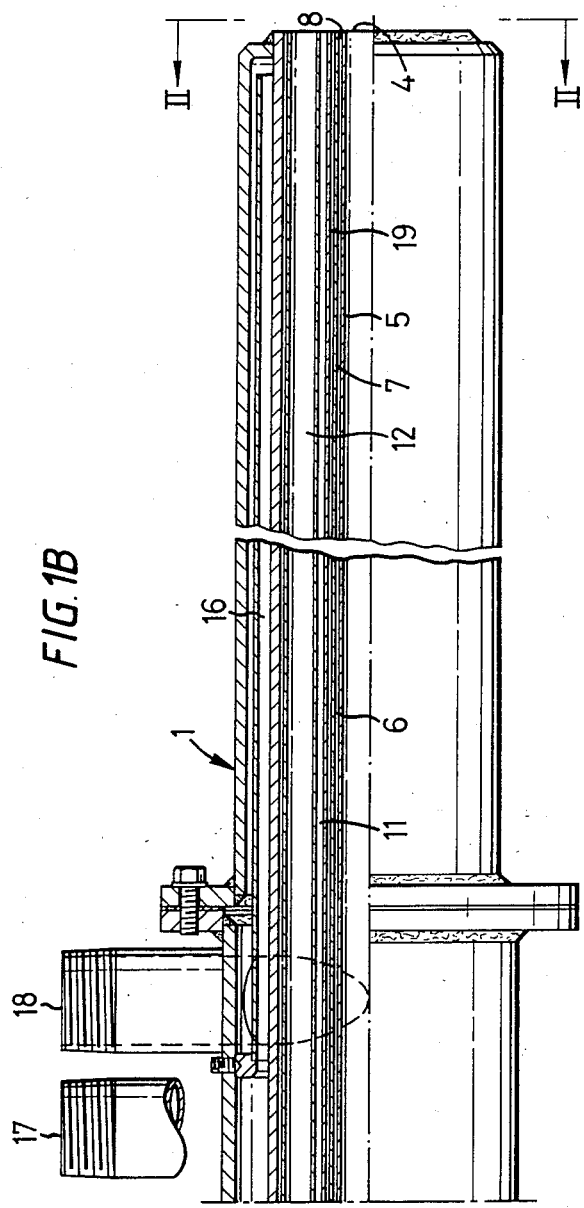
Figure 2:
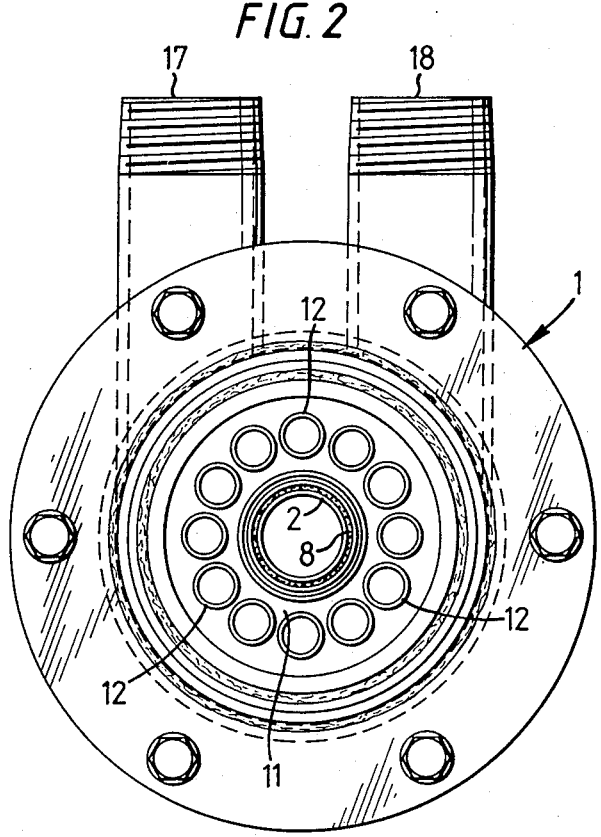
FIG. 2 is an end view looking in the direction of line II—II in FIG. 1.

Referring to the drawings there is shown an oxygen/natural gas/pulverized fuel burner which is generally identified by reference numeral 1.

The burner 1 comprises a central tube 2 which extends from the inlet 3 to the outlet 4 of the burner 1. The wall 5 of the central tube 2 forms one side of a chamber 6 which is formed between the central tube 2 and an outer tube 7 which is concentric with the central tube 2. The gap between the central tube 2 and the outer tube 7 is closed by a weld bead 8 at the outlet 4 and by a seal 9 adjacent the inlet 3.

A connection 10 provides communication with the chamber 6.

The outer tube 7 extends through a tube 19 which forms the inner wall of an oxygen supply passage 11 which is disposed around (concentric to) the central tube 2. Twelve pipes 12 extend through the oxygen supply passage 11 and communicate at their inlet ends with a header 13.

In use pulverised fuel is blown through the central tube 2. Oxygen is introduced through oxygen inlet 14 and passes through the oxygen supply passage 11. The oxygen and pulverised fuel mix at the outlet 4 of the burner 1 and burn.

If desired natural gas may be introduced into the burner 1 through natural gas inlet 15. The natural gas is distributed to pipes 12 via header 13 and travels through the pipes 12 to the outlet 4 of the burner 1. A small volume of natural gas also flows to the outlet 4 of the burner 1 between the outer tube 7 and the tube 19.

The front of the burner 1 is provided with a water jacket 16. In use, cooling water enters through water inlet 17 and leaves through water outlet 18.

Prior to commencing firing the burner 1 IO chamber 6 is pressurized to about 4 bar A with air. Burner 1 is then fired. As the temperature of the burner increases the pressure in chamber 6 increases.

If the wall 5 of the central tube 2 fails the air pressure in chamber 6 drops to the pressure inside the central tube (typically not more than 2 bar). A pressure sensor (not shown) detects the drop in pressure below 4 bar and automatically shuts down the burner by cutting off the oxygen supply and then the pulverised fuel.

Various modifications to the burner shown are envisaged, for example the natural gas supply system may be omitted. In such an embodiment the outer tube 7 could form the inner wall of the oxygen supply passage around (concentric to) the central tube 2.

Attention is drawn to our co-pending application Ser. No. 07/209455 of even date, now U.S. Pat. No. 4,864,943.

What is claimed is:

1. An oxy-fuel burner comprising in combination:
   a generally cylindrical housing having a first and second end and an elongated longitudinal axis;
   disposed within said housing a generally cylindrical elongated central pulverized fuel delivery tube assembly comprising in combination a tube within tube device defining a pressurizable chamber between said tubes, said central pulverized fuel delivery tube assembly having a longitudinal axis coincident with the longitudinal axis of said housing;

a generally elongated tube spaced apart from and disposed between said housing and said pulverized fuel tube assembly thereby defining a first or large annular passage between said outer wall of said tube and said elongated housing and a second smaller annular passage between said inner wall of said elongated tube and the pulverized fuel delivery tube assembly;

a plurality of tubes disposed in said large annular passage parallel to said axis of said housing and distributed evenly around said annular passage;

means to deliver oxygen to said large annular passage; and means to deliver natural gas to said tubes and said smaller annular passage; said burner so constructed and arranged so that said fuel, said oxygen and said natural gas are delivered to said burner housing at or adjacent said first end thereof and said pulverized fuel, oxygen and natural gas exit said second end of said housing adapted to be the flame end of said burner.

2. A burner according to claim 1 wherein a water jacket is disposed around said housing extending from said second end toward said first end.

3. A burner according to claim 1 including means to pressurize said chamber defined by said pulverized fuel delivery tube assembly.

4. A burner according to claim 1 wherein there are twelve tubes disposed in said first or large annular passage.

* * * * *